Aug. 2, 1927.
H. E. PEARSON
1,637,533
TRACTION DRIVING MEANS FOR VEHICLES
Filed June 8, 1923
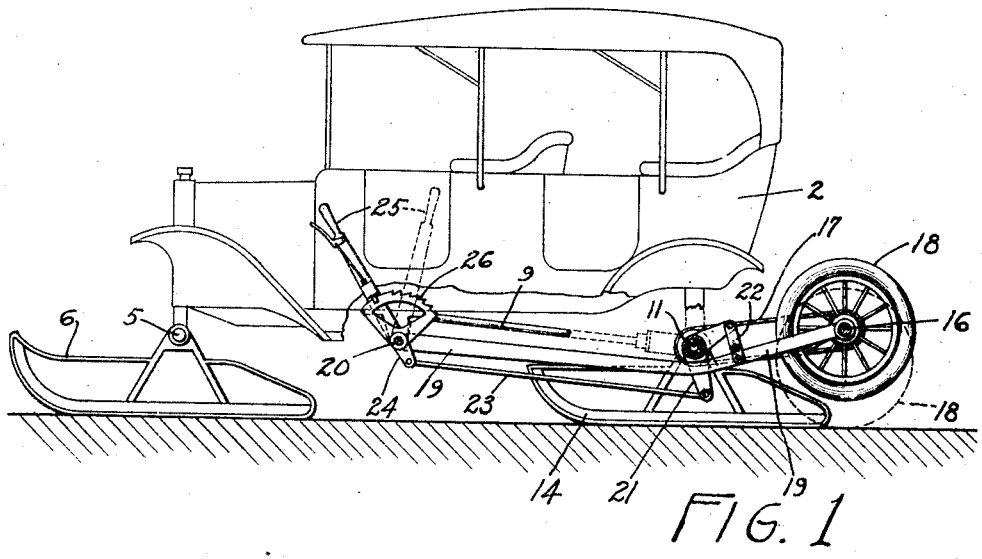
FIG. 1
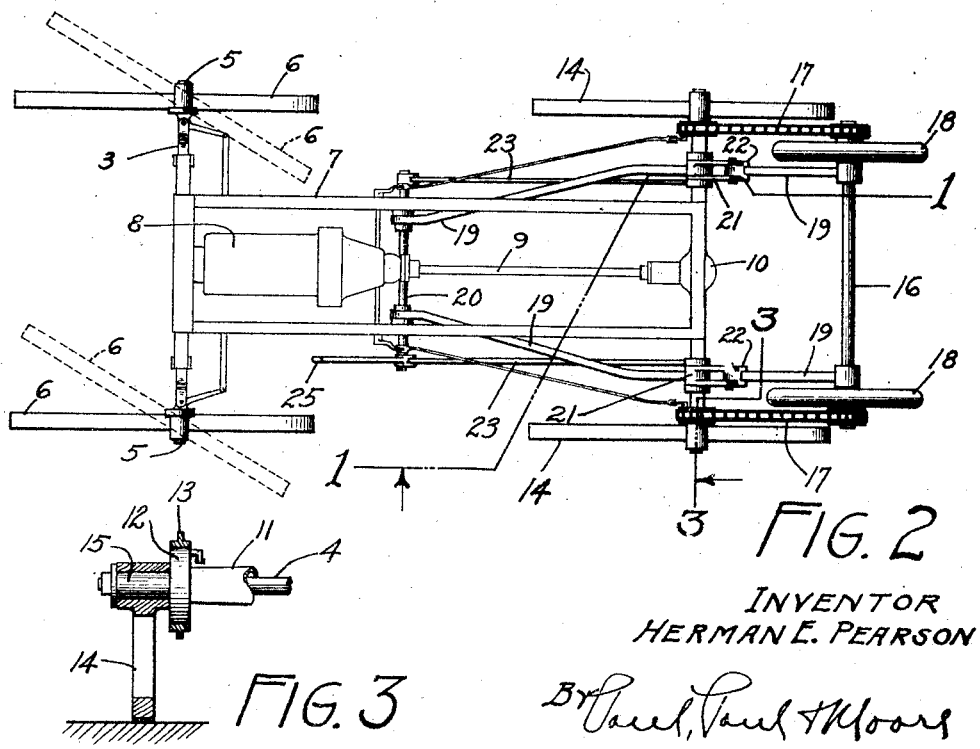
FIG. 2
FIG. 3
INVENTOR
HERMAN E. PEARSON
ATTORNEYS Patented Aug. 2, 1927.

1,637,533

UNITED STATES PATENT OFFICE.

HERMAN E. PEARSON, OF WAYZATA, MINNESOTA.

TRACTION DRIVING MEANS FOR VEHICLES.

Application filed June 8, 1923. Serial No. 644,147.

The object of my invention is to provide improved means for driving a vehicle equipped with runners over snow or ice; the power being applied in such a manner that the vehicle can be easily steered and will ride more easily and comfortably than usual in runner-equipped vehicles driven by traction.

Other objects of the invention will appear from the following detailed description.

The invention consists generally in various constructions and combinations all as hereinafter described and particularly pointed out in the claims.

In the accompanying drawings forming part of this specification,

Figure 1 is a side elevation of a touring car equipped with runners and having my improved traction driving means applied thereto, taken on the section line 1—1 of Figure 2;

Figure 2 is a plan view with the body of the vehicle removed;

Figure 3 is a sectional view on the line 3—3 of Figure 2.

In the drawing:

2 represents the body of any preferred style of touring car having a forward axle 3, a rear axle 4 and forward spindles 5 on which are mounted runners 6 in place of the usual wheels. These runners are oscillated on a vertical axis to steer the machine by the usual steering mechanism connected with the spindles. 7 represents the frame or chassis of the car in which is mounted a source of motor power such as an internal combustion engine 8 having a driving shaft 9 extending back to a differential 10 within the housing 11 of the rear axle.

Brake drums 12 having sprockets 13 are secured to the rear axle in place of the usual rear wheels, by means of integral hubs 15, as shown in Figure 3. Runners 14, similar to the ones provided at the forward end of the car, are mounted upon the hubs 13. In the rear of the car is a driven shaft or axle 16 having driving connections with the rear axle of the car through sprocket chains 17 so that when power is applied to the rear axle it will be transmitted to the shaft or axle 16. Traction wheels 18 are mounted on the axle 16 and are adapted to afford sufficient traction to drive the machine. Thrust bars 19 are connected to the rear axle 16 and project forwardly under the car and are mounted on a transverse thrust shaft 20 which has bearings in the frame of the car at the forward middle portion thereof.

Bell cranks 21 are loosely mounted on the axle housing 11 and have one arm connected by links 22 with the rear portion of the thrust bars 19; the other arms of said bell cranks depending below the rear axle of the car and are connected by rods 23 with crank arms 24 secured to the shaft 20. On this shaft, a lever 25 is mounted and provided with a latch for movement over a quadrant 26. The oscillation of the lever functions to raise and lower the thrust bars 19 and engage the traction wheels with the ground or lift them out of contact therewith. When power is applied to the axle 16 to drive the traction wheels the forward thrust will be transmitted to the forward portion of the vehicle and the strain thereon will be more evenly distributed and it will ride easier and can be guided and controlled with less effort on the part of the driver. Also when it is desired to retard the movement of the car the wheels 18 will be lowered to engage the surface of the road and the brakes applied in the usual manner.

I have shown the axle 16 driven by belts from the rear axle of the car, but it will be understood that a gear mechanism may be substituted for this drive, if preferred.

I claim as my invention:

1. The combination with a vehicle having forward and rear axles and runners thereon and a source of motor power having a driving connection with said rear axle, a driven axle in the rear of said rear axle having driving connections therewith, and traction wheels for said driven axle, thrust bars connected with said driven axle and extending forwardly therefrom, a shaft mounted in said vehicle near the forward portion thereof and connected with the forward ends of said thrust bars, said shaft having crank arms, a lever for rocking said shaft, bell cranks loosely mounted on said vehicle and having one arm pivotally link-connected with said thrust bars and adapted to hold said bars and wheels in a depressed position and the other arms of said bell cranks being connected with said crank arms.

2. The combination with a vehicle having forward and rear axles and runners thereon and a source of motive power having a driving connection with said rear axle, a driven axle in the rear of said rear axle having driving connections therewith, and traction wheels for said driven axle, thrust bars connected with said driven axle and extending forwardly therefrom beneath said rear axle, a shaft mounted transversely in the forward portion of the vehicle and having means for connection with the forward ends of said thrust bars, bell cranks loosely mounted on the housing of said rear axle, links connecting one of the arms of said bell cranks with said thrust bars to exert a downward thrust thereon in the rear of and near said rear axle, the other arms of said bell cranks depending below said rear axle, rods pivotally connected with these depending arms, crank arms secured to said shaft and pivotally connected with said rods, and an operating lever mounted on said shaft for rocking it and exerting a forward pull on said rods to rock said bell cranks and force said thrust bars and the traction wheels downwardly.

3. In combination a motor driven vehicle having runners in lieu of wheels and including a rear axle having the usual driving means, an auxiliary axle in the rear of the rear axle having traction wheels, driving connections between the wheels and the driving means, thrust bars connected with and swingingly supporting the auxiliary axle and extending and pivoted forwardly of the rear axle of the vehicle, bellcranks rockably mounted on the rear axle, links connecting one arm of the bellcranks with the thrust bars, and means connecting the other arms of the bellcranks, for rocking the cranks.

In witness whereof, I have hereunto set my hand this 6th day of June, 1923.

HERMAN E. PEARSON.